United States Patent
Suzuki

(10) Patent No.: US 8,366,211 B2
(45) Date of Patent: Feb. 5, 2013

(54) ELECTRIC PARKING BRAKE CONTROL APPARATUS, ELECTRIC PARKING BRAKE SYSTEM, AND METHOD FOR CONTROLLING ELECTRIC PARKING BRAKE SYSTEM

(75) Inventor: Masakuni Suzuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 905 days.

(21) Appl. No.: 12/021,634

(22) Filed: Jan. 29, 2008

(65) Prior Publication Data
US 2008/0185235 A1    Aug. 7, 2008

(30) Foreign Application Priority Data
Feb. 1, 2007    (JP) .................................. 2007-023379

(51) Int. Cl.
*B60T 8/32*    (2006.01)
*B60T 13/00*    (2006.01)
(52) U.S. Cl. .......................................... 303/191; 303/20
(58) Field of Classification Search .................... 303/20, 303/190, 191; 188/2 D, 1.11 E, 1.11 L
See application file for complete search history.

(56) References Cited

U.S. PATENT DOCUMENTS

| | | | | |
|---|---|---|---|---|
| 4,795,002 A * | 1/1989 | Burgei et al. | ................. | 188/2 D |
| 6,213,259 B1 * | 4/2001 | Hanson et al. | ................. | 188/156 |
| 6,318,819 B1 * | 11/2001 | Bohm et al. | ................. | 303/122 |
| 6,959,794 B2 * | 11/2005 | Ralea et al. | ................. | 188/156 |
| 7,121,633 B2 * | 10/2006 | Tachiiri et al. | ................. | 303/20 |
| 7,140,697 B2 * | 11/2006 | Koga et al. | ................. | 303/20 |
| 2003/0227010 A1 * | 12/2003 | Petrak | ................. | 254/294 |

FOREIGN PATENT DOCUMENTS

| | | |
|---|---|---|
| JP | 8-40255 | 2/1996 |
| JP | 10267059 A | 10/1998 |
| JP | 2002-225701 | 8/2002 |
| JP | 2003172384 A | 6/2003 |
| JP | 2004-161046 | 6/2004 |
| JP | 2004-175203 | 6/2004 |
| JP | 2005-280640 | 10/2005 |
| JP | 2006-137217 | 6/2006 |

OTHER PUBLICATIONS

Decision of Refusal issued on Sep. 2, 2010, in Japanese Patent Application No. 2007-023379 (with English Translation).

* cited by examiner

*Primary Examiner* — Bradley King
*Assistant Examiner* — Vishal Sahni
(74) *Attorney, Agent, or Firm* — Oblon, Spivak, McClellland, Maier & Neustadt, L.L.P.

(57) ABSTRACT

An electric parking brake control apparatus includes: an electric parking brake actuator that pulls cables connected to respective parking brake units of wheels; a brake actuator that controls braking pressures applied to the wheels by service brakes; a pressure-increase control unit that controls the brake actuator to increase the braking pressures to a predetermined value, when a tension of the cables falls below a predetermined target tension after the cables are pulled until the target tension is achieved; and a tension-increase control unit that controls the electric parking brake actuator to pull the cables until the tension of the cables exceeds the target tension, after the brake pressures are increased by the pressure-increase control unit.

15 Claims, 11 Drawing Sheets

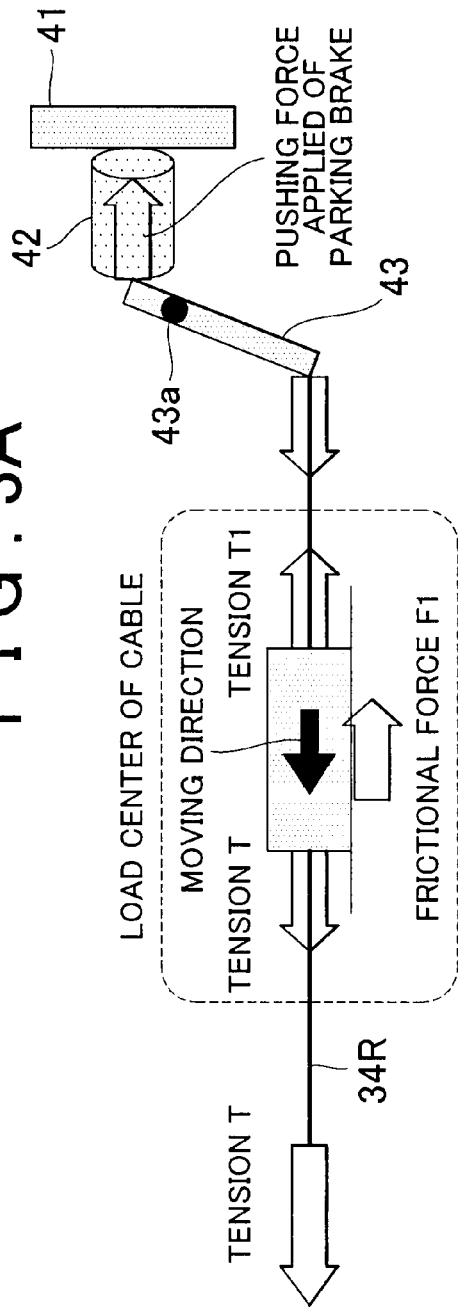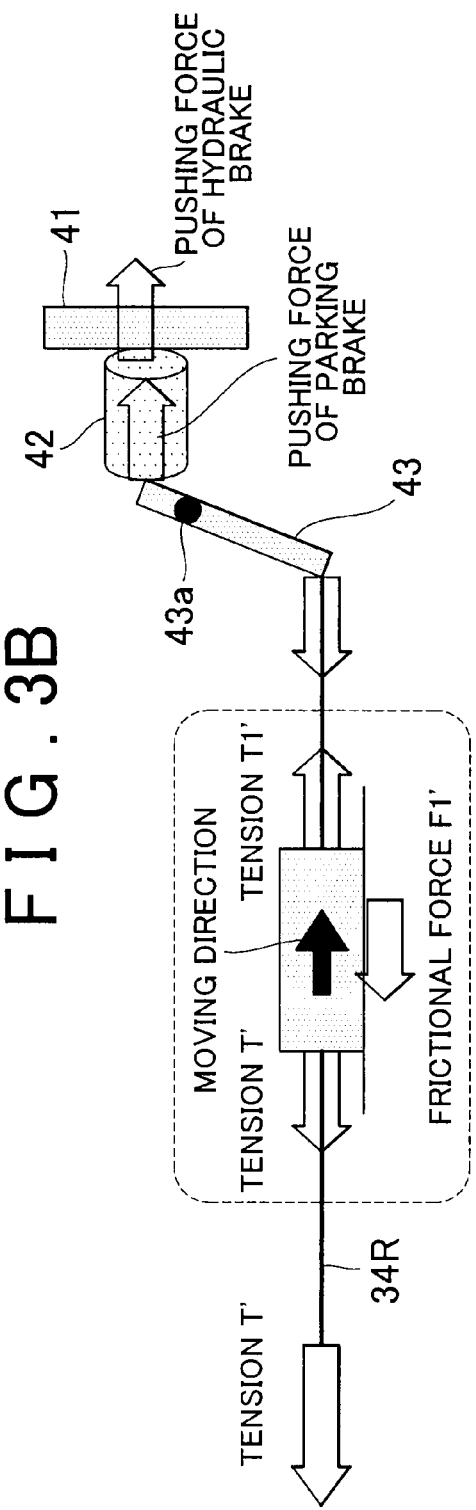

ELECTRIC PARKING BRAKE CONTROL APPARATUS, ELECTRIC PARKING BRAKE SYSTEM, AND METHOD FOR CONTROLLING ELECTRIC PARKING BRAKE SYSTEM

INCORPORATION BY REFERENCE

The disclosure of Japanese Patent Application No. 2007-23379 filed on Feb. 1, 2007 including the specification, drawings and abstract is incorporated herein by reference in its entirety.

BACKGROUND OF THE INVENTION

1. Field of the Invention

The invention relates to an electric parking brake control apparatus that controls an electric parking brake system of a vehicle, an electric parking brake system, and a method for controlling an electric parking brake system.

2. Description of the Related Art

A vehicle brake system is required to serve two functions, that is, a function as a service brake (hereinafter, referred to as "hydraulic brake") that decelerates or stops a vehicle in motion, and a function as a parking brake that maintains the vehicle at standstill. A brake system that performs two functions using a shared structure has been suggested in order to suppress increases in the number of components and cost. A technology in which the hydraulic pressure of the hydraulic brake is used to apply the parking brake may be employed in order to further simplify the structure to reduce the cost. However, in order to reliably maintain a required braking force even if the hydraulic pressure is gradually decreased while the vehicle is parked or to prevent leakage of hydraulic fluid, a technology in which a tension is applied to a cable so as to push a braking member against a disc or a drum is employed in some parking brakes, as described in, for example, Japanese Patent Application Publication No. JP-2005-280640 (JP-A-2005-280640).

A vehicle brake system described in JP-A-2005-280640 includes a hydraulic brake in which hydraulic pressure can be maintained, and a parking brake that automatically applies a tension to a cable so as to maintain a vehicle at standstill. When determining that an accelerator pedal is fully released and the vehicle speed is zero, the vehicle brake system applies the parking brake while maintaining the hydraulic pressure in the hydraulic brake. With this structure, it is possible to automatically apply the parking brake only when needed. After the parking brake is applied, it is possible to maintain the vehicle at standstill mechanically instead of using the hydraulic pressure.

In a parking brake that is automatically applied, a tension is applied to a cable using driving force supplied from an actuator. A target tension is set with, for example, a road inclination, taken into account. The actuator pulls the cable until the tension detected by a tension sensor reaches the target tension. However, a tension that is lower than the target tension is applied to a wheel in some cases, because the tension detected by the tension sensor is a value from which loss of the tension, which is caused due to friction of the cable and a tension transmission system, has not been subtracted. In the vehicle parking brake system described in JP-A-2005-280640, the hydraulic brake may be either released or kept applied, after the parking brake is applied. However, if the hydraulic brake is released, there is a possibility that the vehicle will start moving due to the lack of tension caused by the loss of tension. On the other hand, if the hydraulic brake is kept applied, there is a possibility that the hydraulic pressure is gradually decreased and the vehicle will start moving.

To prevent the vehicle from moving, a tension that is higher than the target tension may be applied to the cable in anticipation of a decrease in the tension from the target tension or lack of the tension. However, it is necessary to provide an actuator having a higher performance in order to apply such higher tension to the cable. This causes inconveniences such as increases in the cost and size of the actuator.

SUMMARY OF THE INVENTION

The invention provides an electric parking brake control apparatus, an electric parking brake system, and a method for controlling an electric parking brake system, which suppress a decrease in a target tension, and increase efficiency of an actuator that pulls cables, for example, reduce the size of the actuator.

A first aspect of the invention relates to an electric parking brake control apparatus including: an electric parking brake actuator that pulls cables connected to respective parking brake units of wheels; a brake actuator that controls braking pressures applied to the wheels by service brakes; a pressure-increase control unit that controls the brake actuator to increase the braking pressures to a predetermined value, when a tension of the cables falls below a predetermined target tension after the cables are pulled until the target tension is achieved; and a tension-increase control unit that controls the electric parking brake actuator to pull the cables until the tension of the cables exceeds the target tension, after the braking pressures are increased by the pressure-increase control unit.

According to the first aspect of the invention, the cables are pulled until the tension of the cables exceeds the target tension, after the braking pressures are increased. Therefore, it is possible to more reliably pull the cables until the tension of the cables exceeds the target tension, without increasing the size of the actuator.

A second aspect of the invention relates to an electric parking brake system including: an electric parking brake actuator that pulls cables connected to respective parking brake units of wheels; a brake actuator that controls braking pressures applied to the wheels by service brakes; and an electric parking control device which includes a pressure-increase control unit that controls the brake actuator to increase the braking pressures to a predetermined value, when a tension of the cables falls below a predetermined target tension after the cables are pulled until the target tension is achieved, and a tension-increase control unit that controls the electric parking brake actuator to pull the cables until the tension of the cables exceeds the target tension, after the braking pressures are increased by the pressure-increase control unit.

A third aspect of the invention relates to a method for controlling an electric parking brake system including an electric parking brake actuator that pulls cables connected to respective parking brake units of wheels, and a brake actuator that controls braking pressures applied to the wheels by service brakes. The method including: controlling the brake actuator to increase the braking pressures to a predetermined value, when a tension of the cables falls below a predetermined target tension after the cables are pulled until the target tension is achieved; and controlling the electric parking brake actuator to pull the cables until the tension of the cables exceeds the target tension, after the braking pressures are increased.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein:

FIGS. 3A and 3B are views each showing an example of a manner in which a tension is generated when a disc brake is formed of a hydraulic brake and a parking brake;

DETAILED DESCRIPTION OF THE EMBODIMENTS

Hereafter, embodiments of the invention will be described with reference to the accompanying drawings. An electric parking brake system 1 according to the embodiments of the invention includes a drum-type or disc-in-type electric parking brake. The electric parking brake may be electrically applied and released. The hydraulic pressure of a service brake (hereinafter, referred to as "hydraulic brake") is used to apply or release the electric parking brake. Therefore, it is possible to reduce the size of an actuator used to apply or release the electric parking brake, the electric power required to drive the actuator, and the noise caused by the actuator.

Figure 1:
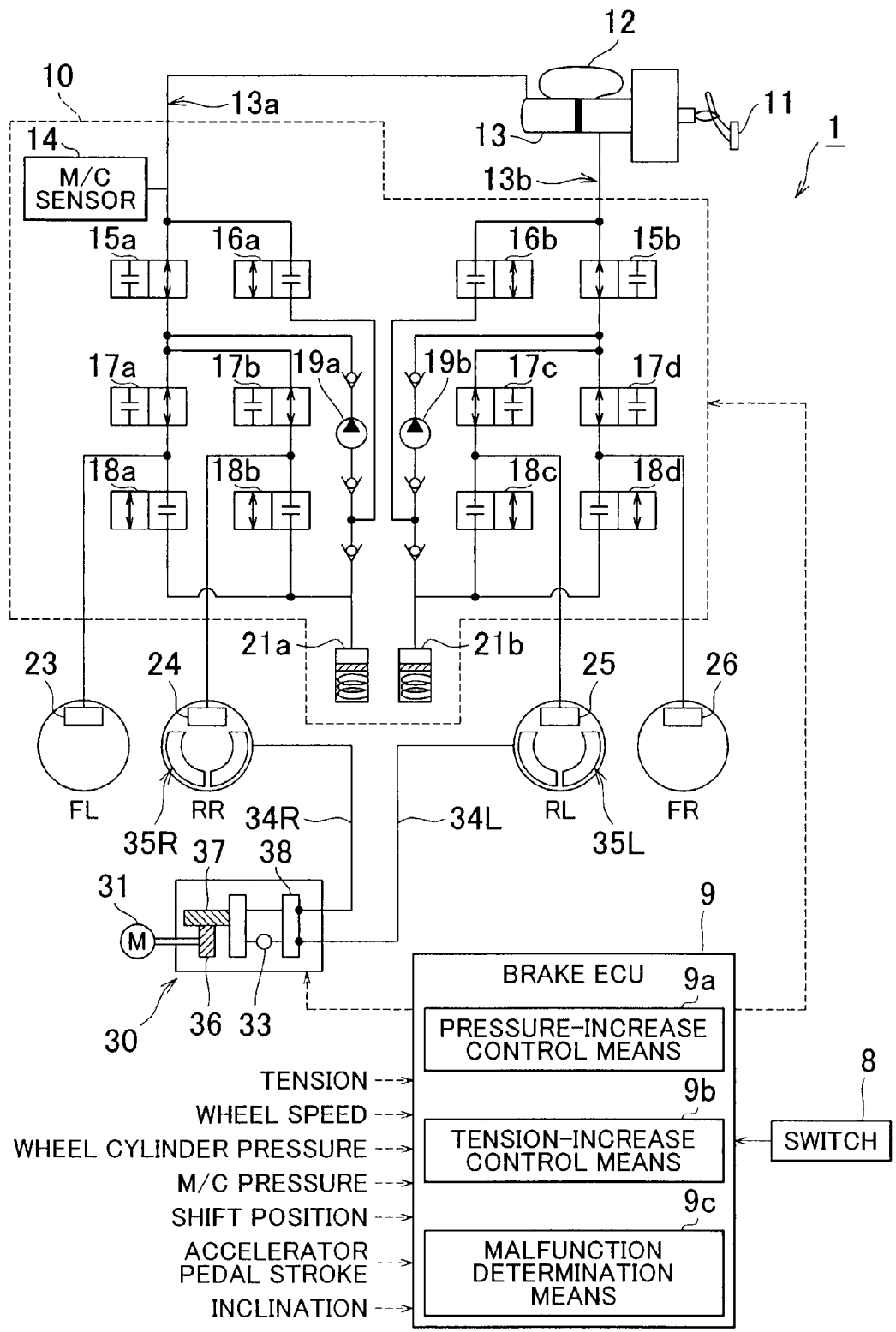
FIG. 1 is a view showing the structure of an electric parking brake system that is controlled by a brake ECU.

FIG. 1 is a view showing the structure of the electric parking brake system 1 that is controlled by a brake ECU 9. The electric parking brake system 1 includes: a brake pedal 11 that serves as an operation member for the hydraulic brake, and that is operated by a driver to decelerate a vehicle; a master cylinder 13 that converts depressing force applied to the brake pedal 11 into hydraulic pressure; a reservoir 12 that stores brake fluid; a brake actuator 10 that individually controls the wheel cylinder pressures which are applied to wheels FL, RR, RL and FR; parking brake units 35R and 35L that are provided to drums of the rear wheels RR and RL, respectively; and an electric parking brake actuator 30 that releases or applies the parking brake units 35R and 35L.

According to the embodiments of the invention, the hydraulic brake and parking brake units 35R and 35L are formed of drum brakes. In this way, the hydraulic brake and the parking brake are integrally formed. The structure in which the hydraulic brake and the parking brake are integrally formed signifies the structure in which the hydraulic brake and the parking brake share the same brake pad (friction member) that is pushed against a brake member to generate braking force. As described later in detail, the hydraulic brake and parking brake units 35R and 35L may be formed of disc brakes. The hydraulic brake may be formed of an ECB (Electronically Controlled Brake System) that generates braking torque using an electric actuator.

The master cylinder 13 has two pressurizing chambers. A hydraulic circuit 13b, which applies hydraulic pressure to a wheel cylinder 25 of the rear left wheel RL and a wheel cylinder 26 of the front right wheel FR, is connected to one of the pressurizing chambers. A hydraulic circuit 13a, which applies hydraulic fluid to a wheel cylinder 24 of the rear right wheel RR and a wheel cylinder 23 of the front left wheel FL, is connected to the other pressurizing chamber.

The hydraulic circuit 13b is communicated with the wheel cylinder 26 via a normally-open master cut valve 15b and a normally-open holding valve 17d, and is communicated with the wheel cylinder 25 via the normally-open master cut valve 15b and a normally-open holding valve 17c. A normally-closed pressure-decreasing valve 18d is connected to the hydraulic circuit 13b, at a position downstream of the holding valve 17d. The circuit that leads to the pressure-decreasing valve 18d branches off from the circuit that leads to the wheel cylinder 26. A normally-closed pressure-decreasing valve 18c is connected to the hydraulic circuit 13b, at a position downstream of the holding valve 17c. The circuit that leads to the pressure-decreasing valve 18c branches off from the circuit that leads to the wheel cylinder 25. The pressure-decreasing valves 18c and 18d are connected, at the downstream-side ends, to the inlet-side of a pump 19b. A reservoir 21b is connected to the inlet-side of the pump 19b, and is connected to the master cylinder 13 via a normally-closed intake valve 16b. The pump 19b is connected, at the discharge side, to the downstream-side of the master cut valve 15b. The hydraulic circuit 13a is mostly the same in the structure as the hydraulic circuit 13b except that a M/C sensor 14, which detects the pressure in the master cylinder 13, is connected to the hydraulic circuit 13a.

When the driver depresses the brake pedal 11, the hydraulic fluid in the master cylinder 13 is compressed, and hydraulic pressure corresponding to the depressing force is applied to the wheel cylinders 23 to 26 via the normally-open master cut valves 15a and 15b, and the holding valves 17a to 17d.

Even when the driver does not operate the brake pedal 11, the brake ECU 9 controls the brake actuator 10 to select the mode of the hydraulic circuits from among three modes, that is, the pressure-increasing mode, the pressure-maintaining mode and the pressure-decreasing mode, thereby controlling the wheel cylinder pressures in the wheel cylinders 23 to 26. For example, to increase the wheel cylinder pressure in the wheel cylinder 26, the brake ECU 9 closes the master cut valve 15b, keeps the holding valve 17d open, and keeps the pressure-decreasing valve 18d closed. Thus, the wheel cylinder pressure in the wheel cylinder 26 is increased by the hydraulic pressure produced by the pump 19b. To maintain the wheel cylinder pressure in the wheel cylinder 26, the brake ECU 9 closes the holding valve 17d while keeping the pressure-decreasing valve 18d closed. Thus, the circuit that leads to the wheel cylinder 26 is blocked and the wheel cylinder pressure in the wheel cylinder 26 is maintained. To decrease the wheel cylinder pressure in the wheel cylinder 26, the brake ECU 9 opens the pressure-decreasing valve 18d while keeping the holding valve 17d closed. Thus, communication is provided between the wheel cylinder 26 and the reservoir 21b, and therefore the wheel cylinder pressure in the wheel cylinder 26 is decreased. The wheel cylinder pressures in the other wheel cylinders 23 to 25 are controlled in the same manner. Intake valves 16a and 16b are opened when the amounts of hydraulic fluid in the reservoir 21a and 21b become small, thereby providing or cutting off flows of the hydraulic fluid from the master cylinder 13 to the pumps 19a and 19b, respectively.

With the structure described above, the brake ECU 9 controls the brake actuator 10, thereby controlling the hydraulic pressure applied to each wheel independently of the hydraulic pressures applied to the other wheels.

Figure 2:
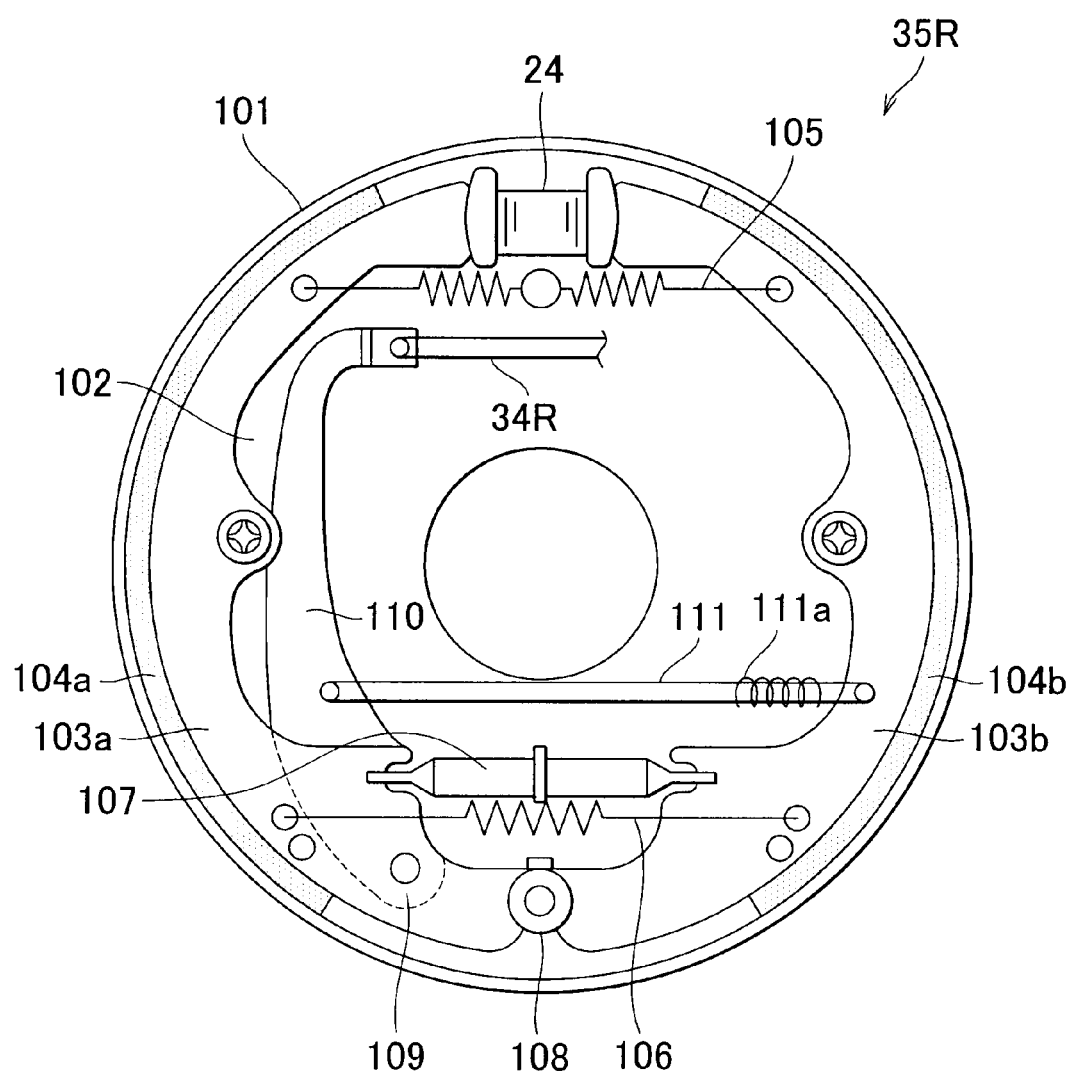
FIG. 2 is a plane view showing a parking brake unit.

The parking brake units 35R and 35L which are provided to the rear wheels RR and RL, respectively, will be described. FIG. 2 is a plane view showing the parking brake unit 35 R. Note that, the parking brake unit 35L has the same structure as that of the parking brake unit 35R.

The parking brake unit 35R includes a drum 101, which is a brake member that rotates together with the wheel, and brake shoes 103a and 103b and lining members 104a and 104b (hereinafter, the brake shoe 103a and the lining member 104a, and the brake shoe 103b and the lining member 104b will be referred to as "brake shoe 103a and brake shoe 103b", respectively). The brake shoes 103a and 103b are supported by a backing plate 102, which serves as a vehicle body-side member, in a manner such that the brake shoes 103a and 103b do not rotate. A predetermined amount of clearance is left between the brake shoes 103a and 103b, and the drum 101. The brake shoes 103a and 103b are pushed against the inner face of the drum 101 due to an increase in the pressure in the wheel cylinder 24 or operation of the electric parking brake actuator 30. Thus, braking torque that suppresses rotation of the wheel is produced.

The paired brake shoes 103a and 103b are connected, at one ends thereof that face each other (upper ends, in FIG. 2), to the respective ends of the wheel cylinder 24. The distance between the ends of the brake shoes 103a and 103b is increased when the pressure in the wheel cylinder 24 is increased. The paired brake shoes 103a and 103b are coupled, at the other ends thereof, with an anchor pin 108 that is fixed to the backing plate 102. With this structure, rotation of the brake shoes 103a and 103b together with the drum 101 is prevented by the frictional force of the brake shoes 103a and 103b during the braking operation. As a result, braking torque is produced.

Biasing force is applied to the brake shoes 103a and 103b by return springs 105 and 106 so that the brake shoes 103a and 103b approach each other. Therefore, if a supply of the hydraulic fluid to the wheel cylinder 24 is cut off, the lining members 104a and 104b move away from the inner face of the drum 101 due to the biasing force.

An adjuster 107 is fitted to the brake shoes 103a and 103b, at positions close to the anchor pin 108. The clearance between the brake shoes 103a and 103b, and the drum 101 is adjusted by the adjuster 107 in accordance with a level of abrasion of the lining members (brake linings) 104a and 104b.

A parking lever 110 is pivotally fitted, by a pin 109, to the brake shoe 103a at the end thereof close to the anchor pin 108. The parking lever 110 and the brake shoe 103b are connected to each other by a strut 111. The strut 111 is provided with a spring 111a that applies force so that the parking lever 110 and the brake shoe 103b move away from each other. A cable 34R is connected to the other end of the parking lever 110. The cable 34R is connected to the electric parking brake actuator 30. Therefore, when the electric parking brake actuator 30 pulls the cable 34R, the parking lever 110 pivots about the pin 109, and pushes the brake shoe 103b against the drum 101 via the strut 111, and the brake shoe 103a is pushed against the drum 101 by the reaction force. As a result, braking torque is produced by the frictional force.

Hereafter, the electric parking brake actuator 30 will be described in detail. In the electric parking brake actuator 30, a worm wheel 36, which rotates about the axis coaxial with the rotating axis of an electric motor 31, is meshed with a worm gear 37, whereby the rotational driving force of the electric motor 31 is transferred to the worm gear 37. A nut member is fitted to the worm gear 37, and the rotational driving force of the worm gear 37 is converted into the linear driving force of the nut member. The linear driving force is equally distributed to two cables 34R and 34L by an equalizer mechanism 38 connected to the nut member via two cables. The cables 34R and 34L are connected to the parking lever (brake lever) 110 of the rear right wheel RR and the parking lever (brake lever) 110 of the rear left wheel RL, respectively. The cable 34L is provided with a tension sensor 33 that detects the tension of the cable 34L.

When the electric motor 31 is rotated in the forward direction, the equalizer mechanism 38 moves toward the electric motor 31 while distributing the linear driving force to the two cables 34R and 34L. Therefore, tensions are applied to the cables 34R and 34L, and the brake shoes are pushed against the drums, whereby the parking brake units 35R and 35L are brought into the braking state. When the electric motor 31 is rotated in the reverse direction, the equalizer mechanism 38 moves away from the electric motor 31 while equalizing the tensions of the two cables 34R and 34L. Therefore, the tensions of the cables 34R and 34L are reduced, whereby the parking brake units 35R and 35L are brought into the releasing state.

When the vehicle is parked, the brake ECU 9 calculates the target tension that is required to park the vehicle based on the inclination of the road on which the vehicle is stopped, the shift position, etc., and rotates the electric motor 31 until the target tension is achieved. The hydraulic brake and parking brake units 35R and 35L may be disc brakes instead of the drum brakes shown in FIG. 2.

The hydraulic brake and parking brake units 35R and 35L structured in the above-described manner are controlled by the brake ECU 9 which is mainly formed of a microcomputer including a CPU, RAM, EEPROM (Electronically Erasable and Programmable Read Only Memory), an input interface, an output interface, a communication controller that communicates with other ECUs, ROM, etc., that are connected to each other by a bus. When the CPU executes programs, pressure-increase control means 9a, tension-increase control means 9b for increasing the target tension for the cables 34R and 34L and pulling the cables 34R and 34L based on the increased target tension, and malfunction determination means 9c for determining whether a malfunction has occurred in the parking brake units 35R and 35L, and for notifying, when it is determined that a malfunction has occurred, the driver of the malfunction.

The brake ECU 9 receives signals indicating the tension detected by the tension sensor 33, the wheel speeds of the wheels FL, RR, RL and FR, the wheel cylinder pressures at the respective wheels, the master cylinder pressure, the shift position, the accelerator pedal stroke (accelerator pedal operation amount), and the inclination of the vehicle in the longitudinal direction (pitching direction) of the vehicle.

A switch 8 connected to the brake ECU 9 is an operation member that selects the state of the electric parking brake system 1 between the braking state and the releasing state. The mode of the electric parking brake system 1 is selected between the automatic mode and the manual mode. In the automatic mode, the electric parking brake system 1 is automatically applied or released. In the manual mode, the electric parking brake system 1 is applied or released by operating the switch 8. In the automatic mode, the brake ECU 9 places the electric parking brake system 1 in the braking state, for example, when the shift lever position indicated by the shift position is P (Park) or N (Neutral) and the vehicle speed is zero. The condition that the master cylinder pressure is equal to or higher than a predetermined value may be added to the above-described conditions under which the electric parking brake system 1 is placed in the braking state.

The brake ECU 9 transmits a signal indicating whether the electric parking brake system 1 is in the braking state or the releasing state to a meter ECU. Therefore, the meter ECU notifies the driver whether the electric parking brake system 1 is in the braking state or the releasing state by illuminating a lamp in a combination meter, which corresponds to the current state.

Next, loss of the tension due to friction of the cables 34R and 34L and a tension transmission system will be described. FIGS. 3A and 3B each show an example of a manner, in which a tension is produced, when the hydraulic brake and the parking brake are formed of a disc brake.

The disc brake is a type of a brake system in which a brake pad 41 is pushed against a disc rotor that rotates together with the wheel to apply braking force to the wheel. When the driver depresses the brake pedal 11, the hydraulic fluid moves a brake piston 42 using a hydraulic circuit similar to the hydraulic circuit shown in FIG. 1. Then, the brake pad 41 connected to the brake piston 42 and a brake pad that is paired with the brake pad 41 pushes the disc rotor interposed between these brake pads, whereby braking force is applied to the wheel.

One end of a parking brake lever 43, which is pivotally supported by a pin 43a, contacts the brake piston 42 at the bottom face which is opposite to the bottom face connected to the brake pad 41. The cable 34R is connected to the other end of the parking brake lever 43. When the parking brake is applied, the load center of the cable 34R moves in the direction, in which the tension T is applied, due to the tension T. Therefore, the parking brake lever 43 pivots about the pin 43a in the clockwise direction, and the one end of the parking brake lever 43 moves the brake piston 42. Thus, the brake pad 41, which is connected to the brake piston 42, and the brake pad, which is paired with the brake pad 41, push the disc rotor interposed between these brake pads, whereby braking force is applied to the wheel.

At this time, the tension T1 applied to the parking brake lever 43 is lower than the tension T detected by the tension sensor 33 (T>T1). This is because a loss is caused in the tension T by the frictional force F1 due to the friction of the cable 34R and the tension transmission system. Therefore, the tension T corresponds to the sum of the tension T1 and the frictional force F1 (T=T1+F1).

Because the frictional force F1 causes a decrease in the tension T, it is necessary to set the target tension to a higher value in anticipation of the loss in order to obtain a desired braking force using the electric motor 31. This increases the size of the electric motor 31, the torque that should be produced by the electric motor 31, and the noise caused by the electric motor 31.

The electric parking brake system 1 in which the hydraulic brake and the parking brake are integrally formed has the following disadvantages. FIG. 3B shows the state in which the hydraulic brake is applied when the parking brake has already been applied using the tension T. If hydraulic pressure is applied when the parking brake has already been applied, the brake piston 42 further moves toward the disc rotor. Therefore, the parking brake lever 43 further pivots. As a result, the tension T1 decreases to the tension T1'. If the tension T1 decreases, the load center of the cable 34R moves toward the parking brake lever 43. However, because the frictional force F1 is applied to the load center of the cable 34R, hysteresis is caused. As a result, the load center moves only by an amount smaller than the amount corresponding to a decrease from the tension from T1 to the tension T1'. Therefore, the tension T1' which is applied to the lever 43 decreases by an amount larger than an amount of decrease in the tension T detected by the tension sensor 33. Particularly, when the frictional force F1' that is decreased by application of the hydraulic brake is sufficiently large, the load center does not move, and a change in the tension T cannot be detected by the tension sensor 33. When the brake ECU 9 does not accurately detect a decrease in the tension, sufficient braking force cannot be obtained at the decreased tension T1' if the driver stops depressing the brake pedal 11. As a result, the vehicle may move on, for example, a slope.

With the electric parking brake system 1 according to the embodiments of the invention, it is possible to minimize the above-described disadvantages without increasing the size of the electric parking brake actuator 30. The following description will be provided on the assumption that the drum bake-type electric parking brake system 1 is operated in the manual mode.

First Embodiment of the Invention

Figure 4A:
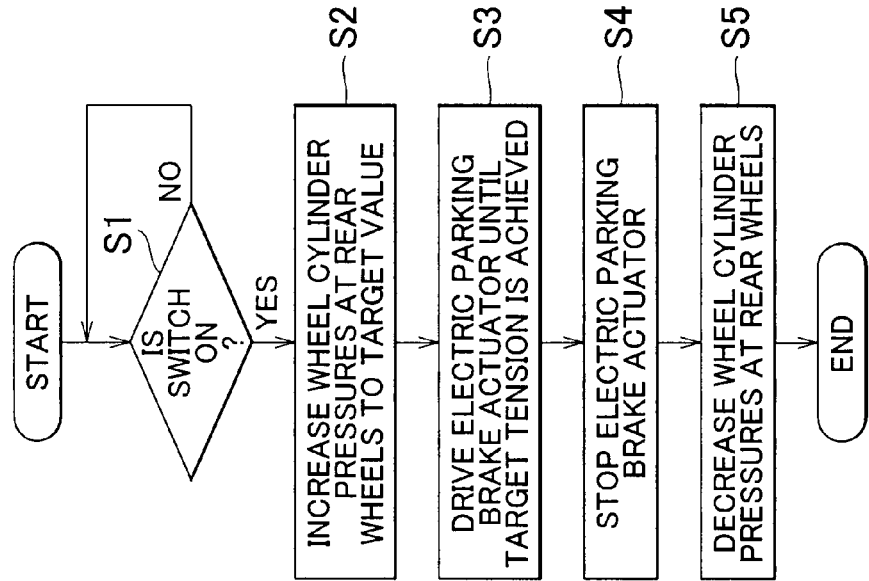
FIG. 4A is a timing chart showing time-changes in an ON-signal from a switch, an ON-signal from an electric motor, the wheel cylinder pressure, and the value detected by a tension sensor in a first embodiment of the invention.
Figure 4B:
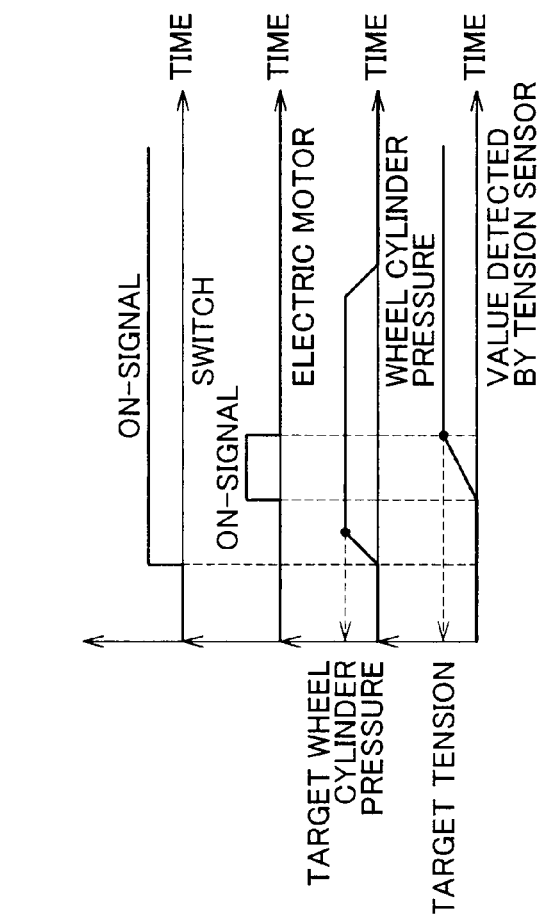
FIG. 4B is a flowchart showing the routine according to which the brake ECU controls the wheel cylinder pressure and the tension in the first embodiment of the invention.

FIG. 4A is a timing chart showing time-changes in an ON signal from the switch 8, an ON-signal from the electric motor 31, the wheel cylinder pressure, and the value detected by the tension sensor. FIG. 4B is a flowchart showing the routine according to which the brake ECU 9 controls the wheel cylinder pressure and the tension.

The brake ECU 9 determines whether the switch 8 is on. When the switch 8 is on, the brake ECU 9 detects an ON signal (S1).

When it is determined that the switch 8 is on, the pressure-increase control means 9a controls the brake actuator 10 to increase the wheel cylinder pressures at the rear wheels RR and RL to the target value (S2).

When the wheel cylinder pressures reach the target value, the tension-increase control means 9b drives the electric motor 31 to pull the cables 34R and 34L until the target tension is achieved (S3).

When the target tension is achieved, the tension-increase control means 9b stops the electric motor 31 (S4).

If a change in the tension that is detected by the tension sensor 33 is within a predetermined range even after the electric motor 31 is stopped, the wheel cylinder pressures at the rear wheels are decreased (S5). Then, the tension is detected again after the wheel cylinder pressures are decreased. If the tension is decreased by an amount equal to or larger than a predetermined value, the electric motor 31 is allowed to rotate.

According to the first embodiment of the invention, the wheel cylinder pressures are increased before the electric motor 31 is driven. Therefore, it is possible to reduce the size of the electric motor 31, the power to drive the electric motor 31, and the noise caused by the electric motor 31 more efficiently than when the parking brake units 35R and 35L are brought into the braking state only by the electric motor 31.

Second Embodiment of the Invention

In the electric parking brake system 1 according to a second embodiment of the invention, the target value of the wheel cylinder pressure is set to the wheel cylinder pressure actually selected by the driver, whereby the load on the electric motor 31 is further reduced.

Figure 5A:
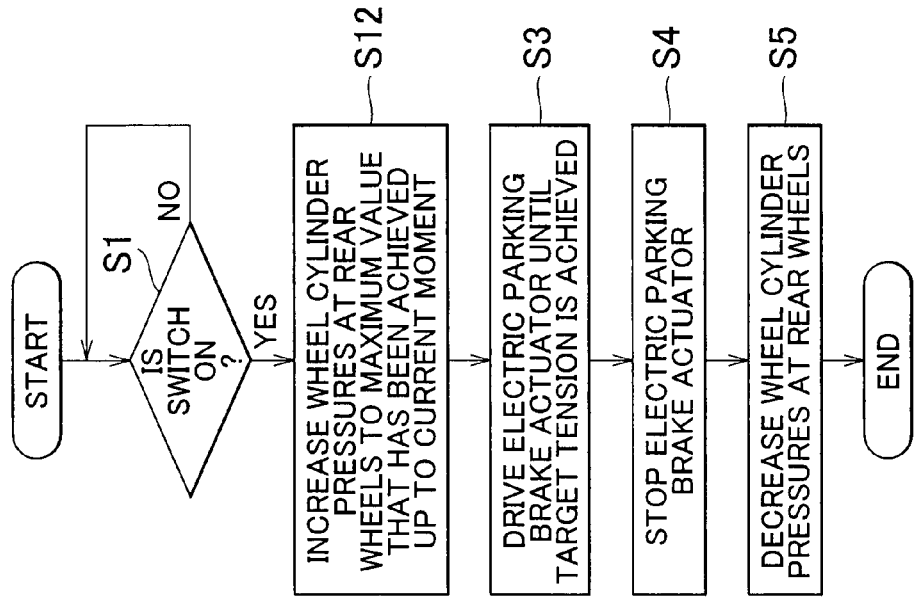
FIG. 5A is a timing chart showing time-changes in an ON-signal from the switch, an ON-signal from the electric motor, the wheel cylinder pressure and the value detected by the tension sensor in a second embodiment of the invention.
Figure 5B:
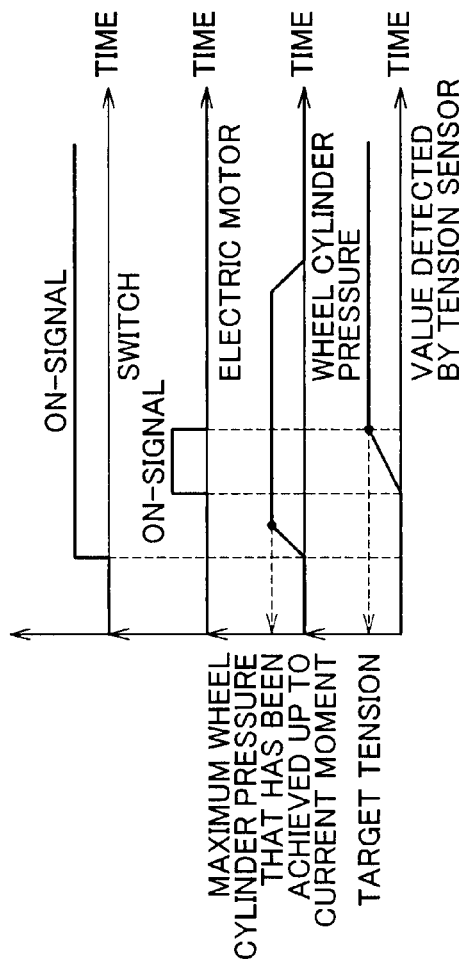
FIG. 5B is a flowchart showing the routine according to which the brake ECU controls the wheel cylinder pressure and the tension in the second embodiment of the invention.

FIG. 5A is a timing chart showing time-changes in an ON signal from the switch 8, an ON-signal from the electric motor 31, the wheel cylinder pressure, and the value detected by the tension sensor. FIG. 5B is a flowchart showing the routine according to which the brake ECU 9 controls the wheel cylinder pressure and the tension. In FIG. 5B, the same step numbers are assigned to the steps that are the same as those in FIG. 4B. Because the routine in FIG. 5B differs from the routine in FIG. 4B only in step S12, step S12 will be described in detail below.

When it is determined that the switch 8 is on, the pressure-increase control means 9a controls the brake actuator 10 to increase the wheel cylinder pressures at the rear wheels RR and RL to the maximum value of the wheel cylinder pressure that has been achieved up to the current moment. "Up to the current moment" signifies a sufficient time period that is required to detect the maximum value of the wheel cylinder pressure, for example, a time period from when the engine is started until when the switch 8 is turned on or a predetermined time period. Alternatively, the target value may be set to the wheel cylinder pressure that is detected when the brake pedal 11 is operated by the driver to bring the parking brake units 35R and 35L into the braking state. Setting the target value to the wheel cylinder pressure detected when the brake pedal 11 is operated by the driver (which is higher than the target wheel cylinder pressure in FIG. 4A) makes it possible to apply the brake to the vehicle more reliably.

According to the second embodiment of the invention, the time lag between when the switch 8 is turned on and when the target tension is applied to the cables 34R and 34L is minimized by the hydraulic brake. In addition, the electric motor 31 pulls the slack cables 34R and 34L, using the hydraulic brake. Therefore, it is possible to more effectively reduce the size of the electric motor 31, the electric power that is necessary to drive the electric motor 31, and the noise caused by the electric motor 31, than in the first embodiment of the invention.

Third Embodiment of the Invention

In the electric parking brake system 1 according to a third embodiment of the invention, if the hydraulic brake has already been applied when the switch 8 is turned on, the parking brake units 35R and 35L are brought into the braking state using the wheel cylinder pressure as the target value.

Figure 6A:
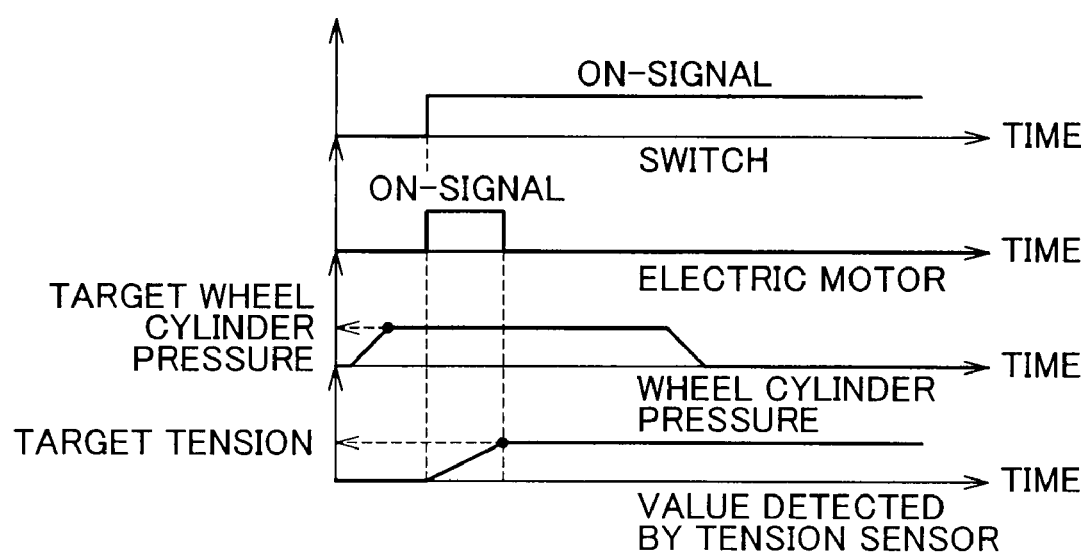
FIG. 6A is a timing chart showing time-changes in an ON-signal from the switch, an ON-signal from the electric motor, the wheel cylinder pressure and the value detected by the tension sensor in a third embodiment of the invention.
Figure 6B:
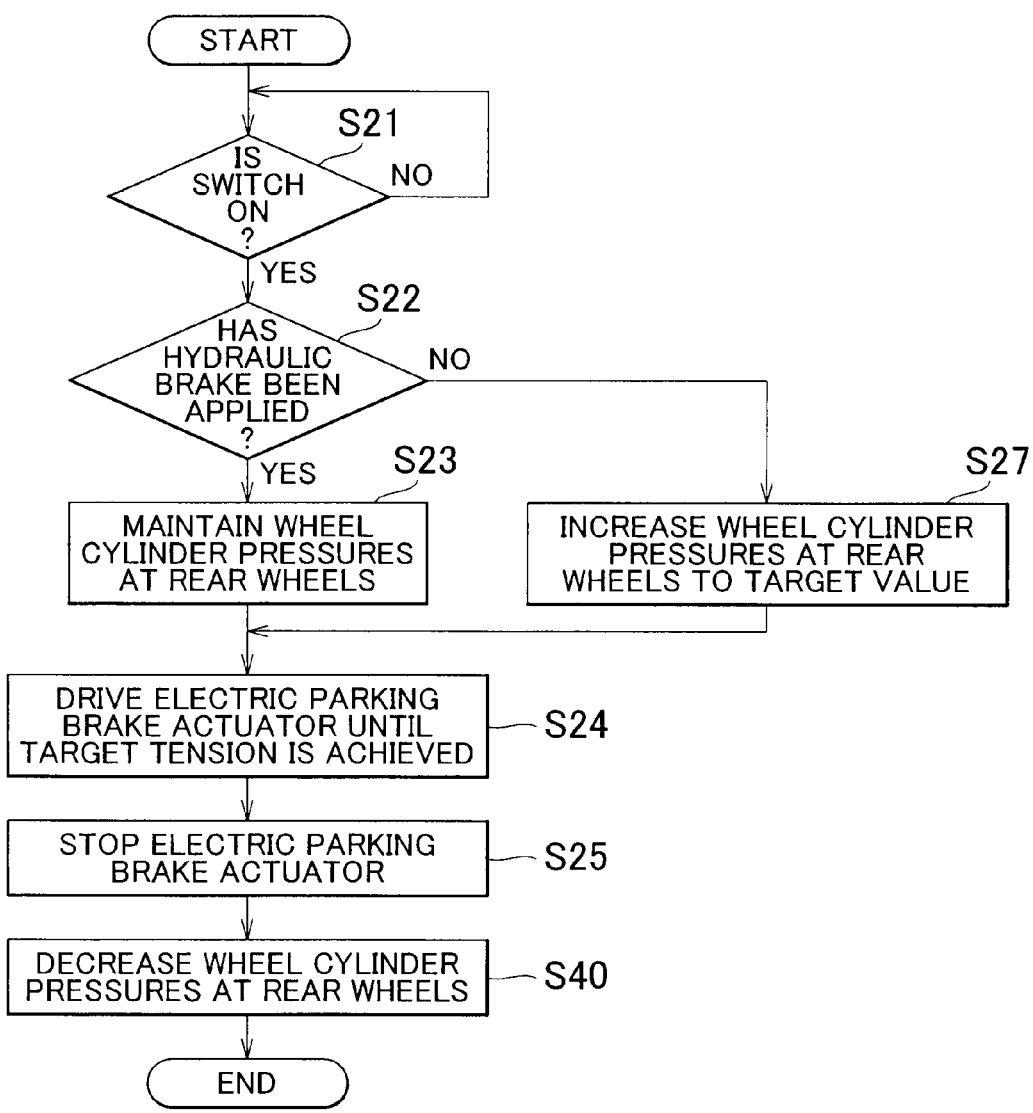
FIG. 6B is a flowchart showing the routine according to which the brake ECU controls the wheel cylinder pressure and the tension in the third embodiment of the invention.

FIG. 6A is a timing chart showing time-changes in an ON signal from the switch 8, an ON-signal from the electric motor 31, the wheel cylinder pressure, and the value detected by the tension sensor. FIG. 6B is a flowchart showing the routine according to which the brake ECU 9 controls the wheel cylinder pressure and the tension.

The brake ECU 9 determines whether the switch 8 is on. When the switch 8 is on, the brake ECU 9 detects an ON-signal (S21).

When an ON-signal is detected, the brake ECU 9 determines whether the hydraulic brake has been applied (S22). Whether the hydraulic brake has been applied is determined based on, for example, whether the wheel cylinder pressure or the master cylinder pressure is equal to or higher than a predetermined value, or based on the amount by which the brake pedal 11 is depressed.

When it is determined that the hydraulic brake has not been applied ("NO" in S22), the pressure-increase control means 9a increases the wheel cylinder pressures at the rear wheels to the target value (S27). The process performed in step S27 is the same as that in the first and second embodiments of the invention.

When it is determined that the hydraulic brake has been applied ("YES" in S22), the pressure-increase control means 9a maintains the wheel cylinder pressures at the rear wheels (S23). Namely, the pressure-increase control means 9a controls the brake actuator 10 (closes the holding valves 17b and 17c while keeping the pressure-decreasing valves 18b and 18c closed) to maintain the wheel cylinder pressures.

Next, the tension-increase control means 9b drives the electric motor 31 to pull the cables 34R and 34L until the target tension is achieved (S24).

When the target tension is achieved, the tension-increase control means 9b stops the tension-increase control means 9b (S25).

If a change in the tension detected by the tension sensor 33 is within a predetermined range even after the electric motor 31 is stopped, the pressure-increase control means 9a decreases the wheel cylinder pressures at the rear wheels. After the wheel cylinder pressures are decreased, the tension is detected again. If the tension is decreased by an amount equal to or larger than a predetermined value, the electric motor 31 is allowed to rotate. Thus, the braking operation performed using the wheel cylinder pressure is replaced with the braking operation performed using the tension.

The wheel cylinder pressures are deceased in step S40 even if the driver is operating the brake pedal 11. The wheel cylinder pressures only at the rear wheels provided with the parking brake units 35R and 35L are decreased. Therefore, when the driver depresses the brake pedal 11, braking force is applied to the front wheels FR and FL by the hydraulic brakes, and braking force is applied to the rear wheels RR and RL by the parking brake units 35R and 35L, respectively. When the driver does not depress the brake pedal 11, braking force is not applied to the front wheels FR and FL whereas braking force is applied to the rear wheels RR and RL by the parking brake units 35R and 35L, respectively.

According to the third embodiment of the invention, braking force is applied to the rear wheels RR and RL using a tension. Therefore, it is possible to reduce the electric power consumed by the system that always requires electric power, for example, the ECB, or the system that needs electric power even for maintaining the braking force, for example, the ESC (Electronic Stability Control).

Fourth Embodiment of the Invention

In the electric parking brake system 1 according to a fourth embodiment of the invention, if the tension sensor 33 detects a decrease in the tension after the target tension is achieved by driving the electric motor 31, the wheel cylinder pressure is increased, and the electric motor 31 is driven again to pull the cables 34R and 34L.

Figure 7:
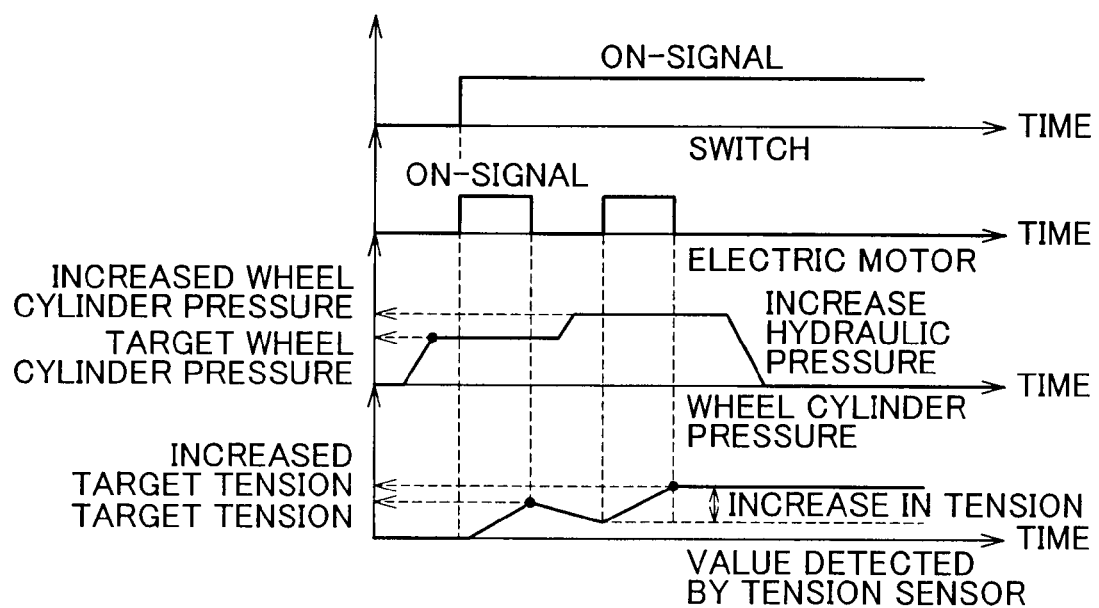
FIG. 7 is a timing chart showing time-changes in an ON-signal from the switch, an ON-signal from the electric motor, the wheel cylinder pressure and the value detected by the tension sensor in a fourth embodiment of the invention.
Figure 8:
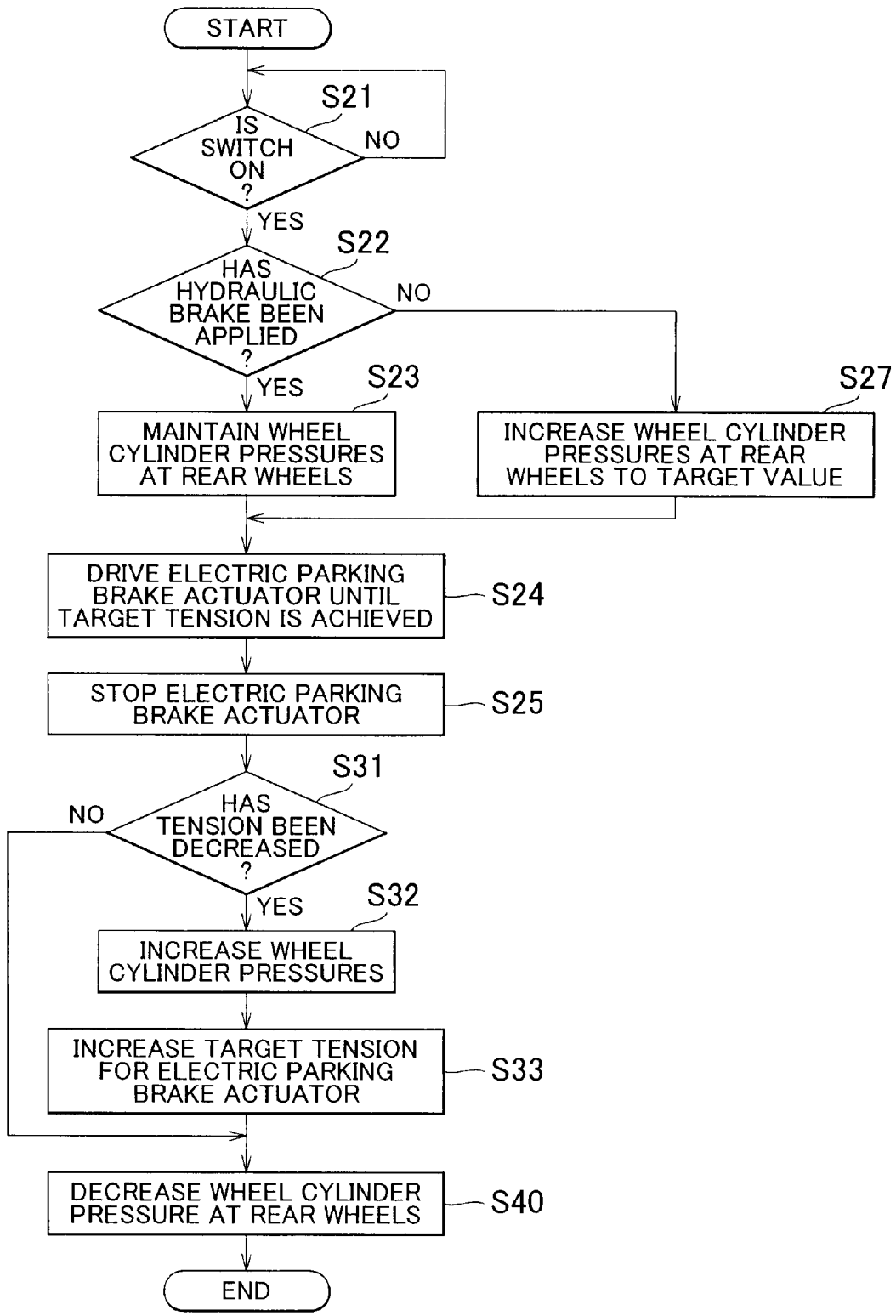
FIG. 8 is a flowchart showing the routine according to which the brake ECU controls the wheel cylinder pressure and the tension in the fourth embodiment of the invention.

FIG. 7 is a timing chart showing time-changes in an ON signal from the switch 8, an ON-signal from the electric motor 31, the wheel cylinder pressure, and the value detected by the tension sensor. FIG. 8 is a flowchart showing the routine according to which the brake ECU 9 controls the wheel cylinder pressure and the tension. In FIG. 8, the same step numbers are assigned to the steps that are the same as those in FIG. 6B.

The brake ECU 9 determines whether the switch 8 is on. When the switch 8 is on, the brake ECU 9 detects an ON-signal (S21).

When an ON-signal is detected, the brake ECU 9 determines whether the hydraulic brake has been applied (S22). Whether the hydraulic brake has been applied is determined based on, for example, whether the wheel cylinder pressure or the master cylinder pressure is equal to or higher than a predetermined value, or based on the amount by which the brake pedal 11 is depressed. FIG. 7 shows the case where the hydraulic brake has been applied. If the hydraulic brake has not been applied ("NO" in S22), the pressure-increase control means 9a increases the wheel cylinder pressures at the rear wheels to the target value (S27).

When it is determined that the hydraulic brake has been applied ("YES" in S22), the pressure-increase control means 9a maintains the wheel cylinder pressure at the rear wheels (S23). Namely, the pressure-increase means 9a controls the brake actuator 10 (closes the holding valves 17b and 17c while keeping the pressure-decreasing valves 18b and 18c closed) to maintain the wheel cylinder pressures.

Next, the tension-increase control means 9b drives the electric motor 31 to pull the cables 34R and 34L until the target tension is achieved (S24). It takes almost no time to maintain the wheel cylinder pressure. Therefore, there is almost no time lag between when a determination is made in step S22 and when pulling the cables 34R and 34L is started in S24.

When the target tension is achieved, the tension-increase control means 9b stops the electric motor 31 (S25).

The tension-increase control means 9b monitors the tension, and determines whether the tension has been decreased (S31). As described above, if the hydraulic brake is applied, the parking brake lever 43 pivots and the tension decreases. Therefore, the pressure-increase control means 9a detects a decrease in the tension due to application of the hydraulic brake.

When it is determined that the tension has been decreased ("YES" in S31), the pressure-increase control means 9a controls the brake actuator 10 to increase the wheel cylinder pressures to a predetermined value (S32). Namely, the pressure-increase control means 9a closes the master cut valves 15a and 15b, keeps the holding valves 17b and 17c open, and keeps the pressure-decreasing valves 18b and 18c closed. Then, the wheel cylinder pressures in the wheel cylinders 24 and 25 are increased by the hydraulic pressures produced by the pumps 19a and 19b, respectively. The wheel cylinder pressures are increased to compensate for a decrease in the tension. Therefore, the wheel cylinder pressures in the wheel cylinders of only the rear wheels are increased. In this case, the target wheel cylinder pressure may be set to a value, which is calculated by increasing the pre-increase wheel cylinder pressure by, for example, 10% to 50%, or the maximum value of the wheel cylinder pressure that has been achieved up to the current moment.

When the wheel cylinder pressures are increased to the predetermined value, the tension-increase control means 9b drives the electric motor 31 again to increase the target tension (S33). Namely, the cables 34R and 34L are pulled using a tension that is higher than the target tension that is used when the cables 34R and 34L are pulled in step S24. Because the cables 34R and 34L are pulled at the tension that is higher than the target tension used in step S24, at which a decrease in the tension is detected. Accordingly, it is possible to suppress a decrease in the tension.

If a change in the tension detected by the tension sensor 33 is within a predetermined range even after the electric motor 31 is stopped, the pressure-increase control means 9a decreases the wheel cylinder pressures at the rear wheels (S40). In this way, the braking operation performed using the wheel cylinder pressure is replaced with the braking operation performed using the tension.

According to the fourth embodiment of the invention, a decrease in the tension is suppressed by increasing the target tension. Also, because the target tension can be increased when the tension is decreased, it is not necessary to set the initial target tension (used in step S24) to an excessively high value. Therefore, it is possible to reduce the rated load of the electric motor 31 and to suppress the noise caused by the electric motor 31.

Fifth Embodiment of the Invention

According to a fifth embodiment of the invention, the control according to the fourth embodiment of the invention is executed over each of the wheels.

The timing chart and the flowchart for the electric parking brake system 1 according to the fifth embodiment of the invention are the same as the timing chart in FIG. 7 and the flowchart in FIG. 8, respectively.

The brake ECU 9 determines whether the switch 8 is on. When the switch 8 is on, the brake ECU 9 detects an ON-signal (S21).

When an ON-signal is detected, the brake ECU 9 determines whether the hydraulic brake has been applied (S22). Whether the hydraulic brake has been applied is determined base on, for example, whether the wheel cylinder pressure or the master cylinder pressure is equal to or higher than a predetermined value, or based on the amount by which the brake pedal 11 is depressed. FIG. 7 shows the state in which the hydraulic brake has been applied. However, when it is determined that the hydraulic brake has not been applied ("NO" in S22), the pressure-increase control means 9a increases the wheel cylinder pressures at the rear wheels to the target value (S27).

When it is determined that the hydraulic brake has been applied ("YES" in S22), the pressure-increase control means 9a maintains the wheel cylinder pressures at the rear wheels (S23). Namely, the pressure-increase control means 9a controls the brake actuator 10 (closes the holding valves 17b and 17c while keeping the pressure-decreasing valve 18b and 18c closed) to maintain the wheel cylinder pressures.

Next, the tension-increase control means 9b drives the electric motor 31 to pull the cables 34R and 34L until the target tension is achieved (S24). Because it takes almost no time to maintain the wheel cylinder pressure, there is almost no time lag between when a determination is made in step S22 and when pulling of the cables 34R and 34L is started in S24.

When the target tension is achieved, the brake ECU 9 stops the electric motor 31 (S25).

The tension-increase control means 9b monitors the tension, and determines whether the tension has been decreased (S31). As described above, if the hydraulic brake is applied, the parking brake lever 43 pivots and the tension decreases. Therefore, the pressure-increase control means 9a detects a decrease in the tension due to application of the hydraulic brake.

When it is determined that the tension has been decreased ("YES" in S31), the pressure-increase control means 9a controls the brake actuator 10 to increase the wheel cylinder pressure at the wheel, of which the wheel cylinder pressure needs to be increased, to a predetermined value. "The wheel of which the wheel cylinder pressure needs to be increased" is, for example, one of the rear wheels RR and RL, at which the tension is more likely to decrease than the other of the rear wheels RR and RL. The frictional force F1 of the cables 34R and 34L and the tension transmission system exhibits a predetermined tendency. Therefore, the rear wheel, of which the frictional force F1 detected in advance is larger than the frictional force F1 of the other rear wheel, is used as the wheel of which the wheel cylinder pressure needs to be increased. When the tension sensor 33 is provided to each of the cables 34R and 34L, one of or both the rear wheels RR and RL is/are selected based on the tensions detected by the tension sensors 33.

The pressure-increase control means 9a controls the brake actuator 10 to increase the wheel cylinder pressure of the selected rear wheel.

When the wheel cylinder pressure is increased to a predetermined value, the tension-increase control means 9b drives the electric motor 31 again to increase the target tension (S33). The tension at the rear wheel, of which the wheel cylinder pressure is increased, is decreased by an amount larger than the amount by which the tension at the rear wheel, of which the wheel cylinder pressure is not increased, is decreased. However, because the electric parking brake actuator 30 pulls the cables 34R and 34L while equalizing the tensions of the cables 34R and 34L, the amount by which the cable 34R or the cable 34L is pulled is larger at the rear wheel, of which the wheel cylinder pressure is increased, than at the rear wheel, of which the wheel cylinder pressure is not increased. As a result, the cables 34R and 34L are both pulled using a tension higher than the target tension that is used when the cables 34R and 34L are pulled in step S24.

If a change in the tension detected by the tension sensor 33 is within a predetermined range even after the electric motor 31 is stopped, the pressure-increase control means 9a decreases the wheel cylinder pressure at the rear wheel (S40). Thus, the braking operation performed using the wheel cylinder pressure is replaced with the braking operation performed using the tension.

According to the fifth embodiment of the invention, the effects of the fourth embodiment of the invention can be obtained. In addition, the wheel cylinder pressure at the wheels, of which the wheel cylinder pressure need not be increased, are not increased. Therefore, it is possible to reduce the electric power required to drive the electric motor 31 and the noise caused by the electric motor 31.

Sixth Embodiment of the Invention

In the electric parking brake system 1 according to a sixth embodiment of the invention, when a decrease in the tension is detected, the wheel cylinder pressures and the target tension are increased as in the fourth and fifth embodiments of the invention. However, if a decrease in the tension is continuously detected, it is determined whether a malfunction has occurred. When it is determined that a malfunction has occurred, the driver is notified of the malfunction.

Figure 9:
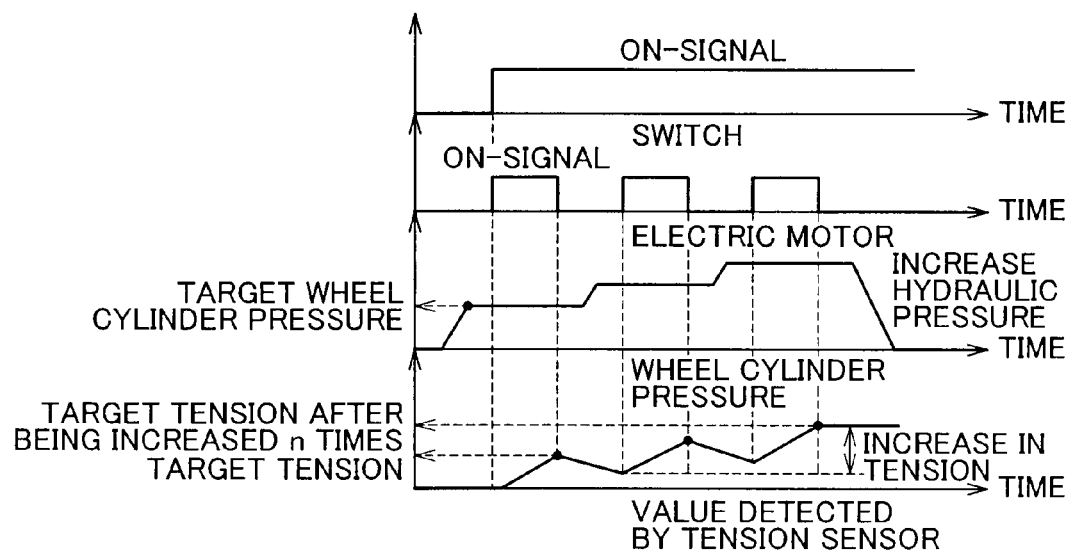
FIG. 9 is a timing chart showing time-changes in an ON-signal from the switch, an ON-signal from the electric motor, the wheel cylinder pressure and the value detected by the tension sensor in a sixth embodiment of the invention.
Figure 10:
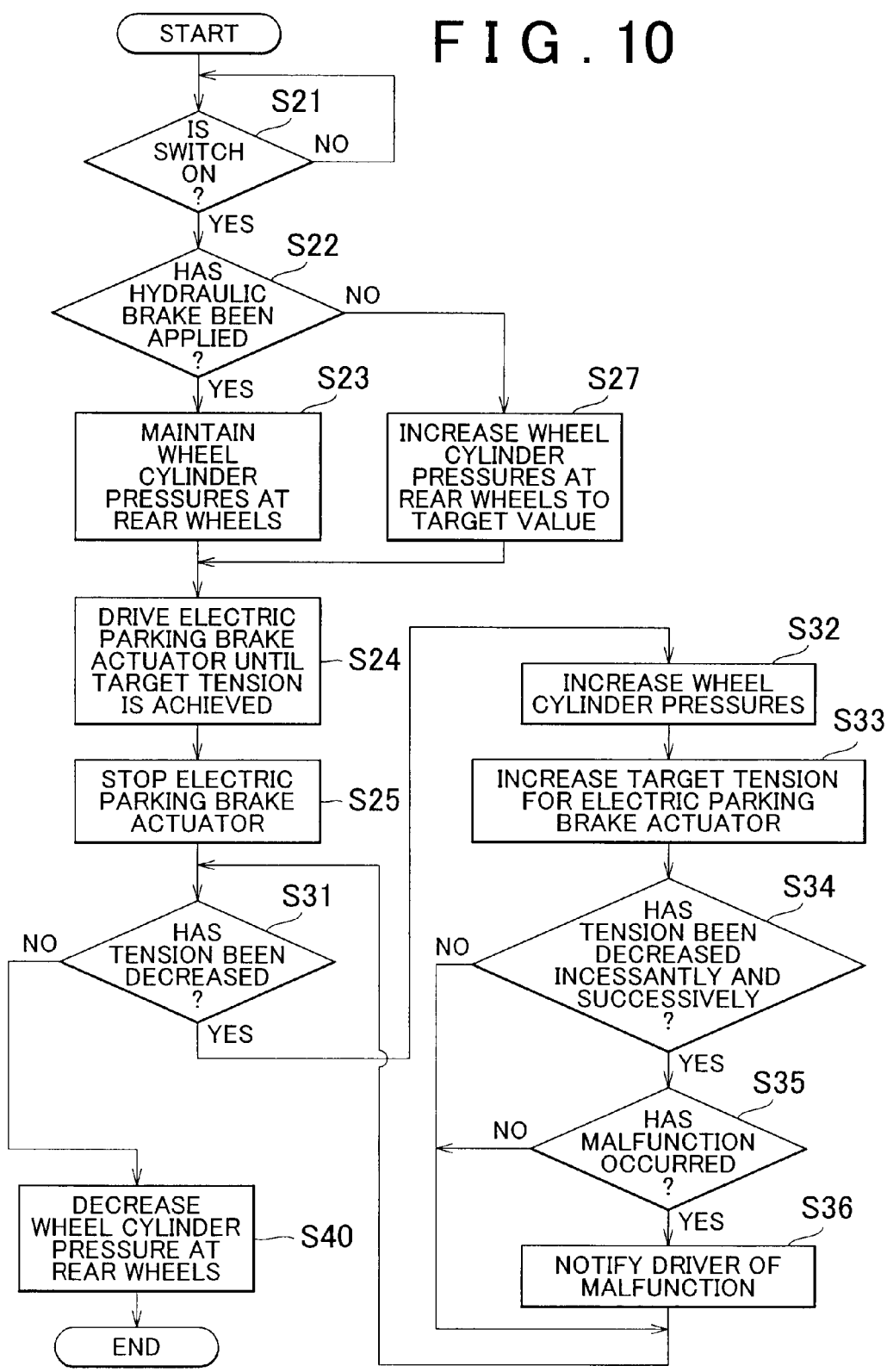
FIG. 10 is a flowchart showing the routine according to which the brake ECU controls the wheel cylinder pressure and the tension in the sixth embodiment of the invention.

FIG. 9 is a timing chart showing time-changes in an ON signal from the switch 8, an ON-signal from the electric motor 31, the wheel cylinder pressure, and the value detected by the tension sensor. FIG. 10 is a flowchart showing the routine according to which the brake ECU 9 controls the wheel cylinder pressure and the tension. In FIG. 10, the same step numbers are assigned to the steps that are the same as those in FIG. 8.

The brake ECU 9 determines whether the switch 8 is on (S21). When the switch 8 is on, the brake ECU 9 detects an ON-signal.

When an ON-signal is detected, the brake ECU 9 determines whether the hydraulic brake has been applied (S22). Whether the hydraulic brake has been applied is determined based on, for example, whether the wheel cylinder pressure or the master cylinder pressure is equal to or higher than a predetermined value, or based on the amount by which the brake pedal 11 is depressed. FIG. 9 shows the case where the hydraulic brake has been applied. However, when it is determined that the hydraulic brake has not been applied ("NO" in S22), the pressure-increase control means 9a increases the wheel cylinder pressures at the rear wheels to the target value (S27).

When it is determined that the hydraulic brake has been applied ("YES" in S22), the pressure-increase control means 9a maintains the wheel cylinder pressures at the rear wheels (S23). Namely, the pressure-increase control means 9a controls the brake actuator 10 (closes the holding valves 17b and 17c while keeping the pressure-decreasing valves 18b and 18c closed) to maintain the wheel cylinder pressures.

Next, the tension-increase control means 9b drives the electric motor 31 to pull the cables 34R and 34L until the target tension is achieved (S24). Because it takes almost no time to maintain the wheel cylinder pressure, there is almost no time lag between when a determination is made in step S22 and when pulling of the cables 34R and 34L is started in step S24.

When the target tension is achieved, the tension-increase control means 9b stops the electric motor 31 (S25).

The tension-increase control means 9b monitors the tension, and determines whether the tension has been decreased (S31). As described above, if the hydraulic brake is applied, the parking brake lever 43 pivots and the tension decreases. Therefore, the pressure-increase control means 9a detects a decrease in the tension due to application of the hydraulic brake.

When it is determined that the tension has been decreased ("YES" in S31), the pressure-increase control means 9a controls the brake actuator 10 to increase the wheel cylinder pressures to a predetermined value (S32). Namely, the pressure-increase control means 9a closes the master cut valves 15a and 15b, keeps the holding valves 17b and 17c open, and keeps the pressure-decreasing valves 18b and 18c closed. Thus, the wheel cylinder pressures in the wheel cylinders 24 and 25 are increased by the hydraulic pressures produced by the pumps 19a and 19b, respectively. Because the wheel cylinder pressures are increased to compensate for a decrease in the tension, the wheel cylinder pressures only at the rear wheels, or the wheel cylinder pressure at only one of the rear wheels RR and RL may be increased.

When the wheel cylinder pressures are increased to the predetermined value, the tension-increase control means 9b drives the electric motor 31 again to increase the target tension (S33). Namely, the cables 34R and 34L are pulled using a tension that is higher than the target tension used when the cables 34R and 34L are pulled in step S24. Because the cables 34R and 34L are pulled using the tension that is higher than the target tension in step S24, at which a decrease in the tension is detected, it is possible to suppress a decrease in the tension.

Next, the tension-increase control means 9b determines whether the tension has been incessantly and successively decreased (S34). Whether the tension has been incessantly decreased is determined based on whether the tension has been decreased at a frequency equal to or higher than a predetermined value within a predetermined period. Whether the tension has been successively decreased is determined, for example, based on whether the tension is decreased every time the parking brake is applied.

When it is not determined that the tension has been incessantly and successively decreased, the tension-increase control means 9b executes step S31 again to periodically determine whether the tension has been incessantly and successively decreased. Therefore, it is possible to appropriately determine whether the tension has been incessantly and successively decreased.

When it is determined that the tension has been incessantly and successively decreased ("YES" in S34), the malfunction determination means 9c determines whether a malfunction has occurred in at least one of the parking brake units 35R and 35L (S35). Whether a malfunction has occurred is determined based on whether the relationship between the time during which the electric motor 31 is driven and the tension T, the relationship between the time during which the electric motor 31 is driven and the displacement amount of the equalizer mechanism 38, etc., which are detected when the vehicle is shipped differ from those in the current state. These relationships significantly change if the cables 34R and 34L are completely or partially cut off or if the cables 34R and 34L are caught on something and stop moving. Therefore, it is possible to determine whether a malfunction has occurred based on these relationships.

When it is determined that a malfunction has occurred ("YES" in S35), the malfunction determination means 9c notifies the driver that a malfunction has occurred in at least one of the parking brake units 35R and 35L (S36). This notification is made, for example, by illuminating a lamp in the combination meter.

When it is determined that the tension has not been decreased ("NO" in S31), the pressure-increase control means 9a decreases the wheel cylinder pressure at the rear wheel (S40). Thus, the braking operation performed using the wheel cylinder pressure is replaced with the braking operation performed using the tension.

According to the sixth embodiment of the invention, it is possible to determine whether a malfunction has occurred in the electric parking brake system 1 by determining whether the tension has been decreased and to notify the driver of the malfunction.

As described above, with the brake ECU 9 according to each embodiment of the invention, it is possible to suppress a decrease in the target tension while the vehicle is parked, and reduce the size of the actuator for pulling the cables 34R and 34L, the electric power required to drive the actuator, and the noise caused by the actuator.

What is claimed is:

1. An electric parking brake control apparatus, comprising:
   an electric parking brake actuator that pulls cables connected to respective parking brake units of wheels;
   a brake actuator that controls braking pressures applied to the wheels by service brakes;
   a pressure-increase control unit that controls the brake actuator such that when a tension of the cables falls below a predetermined first target tension after the electric parking brake actuator pulls the cables to the first target tension, the pressure increase control unit increases the braking pressures applied to the wheels by service brakes to a predetermined value; and
   a tension-increase control unit that sets a second target tension greater than the first target tension and controls the electric parking brake actuator to pull the cables until the tension of the cables reaches the second target tension,
   wherein the cables are pulled to maintain the second target tension after the tension of the cables falls below the first target tension and after the braking pressures applied to the wheels by service brakes are increased to the predetermined value by the pressure-increase control unit.

2. The electric parking brake control apparatus according to claim 1, wherein the pressure-increase control unit increases at least one of the braking pressures, which is applied to a rear wheel, to the predetermined value.

3. The electric parking brake control apparatus according to claim 1, wherein the pressure-increase control unit decreases the braking pressures, after the cables are pulled until the tension of the cables reaches the second target tension.

4. The electric parking brake control apparatus according to claim 1, further comprising:
   a malfunction determination unit that determines whether a malfunction has occurred in at least one of the parking brake units when the tension falls below the predetermined first target tension after the electric parking brake actuator pulls the cables to the first target tension, and that notifies, if it is determined that a malfunction has occurred in at least one of the parking brake units, a driver of the malfunction.

5. An electric parking brake system, comprising:
   an electric parking brake actuator that pulls cables connected to respective parking brake units of wheels;
   a brake actuator that controls braking pressures applied to the wheels by service brakes;
   an electric parking control device which includes a pressure-increase control unit that controls the brake actuator such that when a tension of the cables falls below a predetermined first target tension after the electric parking brake actuator pulls the cables to the first target tension, the pressure increase control unit increases the braking pressures applied to the wheels by service brakes to a predetermined value; and
   a tension-increase control unit that sets a second target tension greater than the first target tension and controls the electric parking brake actuator to pull the cables until the tension of the cables reaches the second target tension,
   wherein the cables are pulled to maintain the second target tension after the tension of the cables falls below the first target tension and after the braking pressures applied to the wheels by service brakes are increased to the predetermined value by the pressure-increase control unit.

6. The electric parking brake system according to claim 5, wherein the pressure-increase control unit increases at least one of the braking pressures, which is applied to a rear wheel, to the predetermined value.

7. The electric parking brake system according to claim 5, wherein the pressure-increase control unit decreases the braking pressures, after the cables are pulled until the tension of the cables reaches the second target tension.

8. The electric parking brake system according to claim 5, further comprising:
a malfunction determination unit that determines whether a malfunction has occurred in at least one of the parking brake units when the tension falls below the predetermined first target tension after the electric parking brake actuator pulls the cables to the first target tension, and that notifies, if it is determined that a malfunction has occurred in at least one of the parking brake units, a driver of the malfunction.

9. A method for controlling an electric parking brake system including an electric parking brake actuator that pulls cables connected to respective parking brake units of wheels, and a brake actuator that controls braking pressures applied to the wheels by service brakes, the method comprising:
determining whether a tension of the cables falls below a predetermined first target tension after the electric parking brake actuator pulls the cables to the first target tension;
controlling the brake actuator such that when the tension of the cables falls below the predetermined first target tension after the electric parking brake actuator pulls the cables to the first target tension, the braking pressures applied to the wheels by service brakes are increased to a predetermined value; and
controlling the electric parking brake actuator to sets a second target tension greater than the first target tension and pull the cables until the tension of the cables reaches the second target tension, wherein the cables are pulled to maintain the second target tension after the tension of the cables falls below the first target tension and after the braking pressures applied to the wheels by service brakes are increased to the predetermined value.

10. The method according to claim 9, wherein at least one of the braking pressures, which is applied to a rear wheel, is increased to the predetermined value.

11. The method according to claim 9, wherein the braking pressures are decreased, after the cables are pulled until the tension of the cables reaches the second target tension.

12. The method according to claim 9, further comprising:
determining whether a malfunction has occurred in at least one of the parking brake units when the tension falls below the predetermined first target tension after the electric parking brake actuator pulls the cables to the first target tension, and notifying, if it is determined that a malfunction has occurred in at least one of the parking brake units, a driver of the malfunction.

13. The electric parking brake control apparatus according to claim 1, wherein the electric parking brake actuator is stopped when the first target tension is achieved,
wherein the tension-increase control unit determines whether the tension of the cables falls below the first target tension after the electric parking brake actuator is stopped, and
wherein the pressure-increase control unit increases the braking pressures to the predetermined value if the tension increase control unit determines that the tension of the cables falls below the first target tension.

14. The electric parking brake system according to claim 5, wherein the electric parking brake actuator is stopped when the first target tension is achieved,
wherein the tension-increase control unit determines whether the tension of the cables falls below the first target tension after the electric parking brake actuator is stopped, and
wherein the pressure-increase control unit increases the braking pressures to the predetermined value if the tension increase control unit determines that the tension of the cables falls below the first target tension.

15. The method according to claim 9, further comprising:
stopping the electric parking brake actuator when the first target tension is achieved;
determining whether the tension of the cables falls below the first target tension after the electric parking brake actuator is stopped; and
increasing the braking pressures to the predetermined value if the tension increase control unit determines that the tension of the cables falls below the first target tension.

\* \* \* \* \*